Sept 10, 1957

H. M. BARTON, JR 2,806,148

PHOTOELECTRIC ANALYZER

Filed March 31, 1952

2 Sheets-Sheet 1

INVENTOR.
H. M. BARTON, JR.

BY
Hudson & Young
ATTORNEYS

INVENTOR.
H. M. BARTON, JR.
BY
Hudson & Young
ATTORNEYS

United States Patent Office 2,806,148
Patented Sept. 10, 1957

2,806,148

PHOTOELECTRIC ANALYZER

Hugh M. Barton, Jr., Bartlesville, Okla., assignor to Phillips Petroleum Company, a corporation of Delaware Application March 31, 1952, Serial No. 279,699

4 Claims. (Cl. 250—218)

This invention relates to photoelectric analyzers. In one aspect, it relates to an improved photoelectric amplifier. In another aspect, it relates to an improved input circuit for a photoelectric amplifier.

Where variations in light intensity are to be measured photoelectrically, as in the analysis of sample streams by passing a radiation beam through a sample and determining the amount of radiation absorbed thereby, the signals to be measured vary slowly with time. That is, they are essentially direct current signals. In order to properly amplify such signals, a bulky and expensive direct current amplifier has heretofore been necessary.

In accordance with this invention, I provide circuits whereby the slowly varying voltages to be measured are transformed into signals having an alternating current character so that they can readily be amplified by the usual compact and inexpensive alternating current amplifier. In connection with this improvement, I have devised a number of cooperating circuits which yield important benefits in alternating current amplifiers, particularly in combination with photoelectric analyzers.

It is an object of the invention to provide a photoelectric analyzer embodying new and improved circuits.

It is a further object to provide an improved photoelectric amplifier.

It is a still further object to provide an improved input circuit for a photoelectric amplifier.

It is a still further object to provide the foregoing results with circuits which are simple in construction, reliable in operation, and which utilize a minimum number of standard circuit components.

Figure 1:
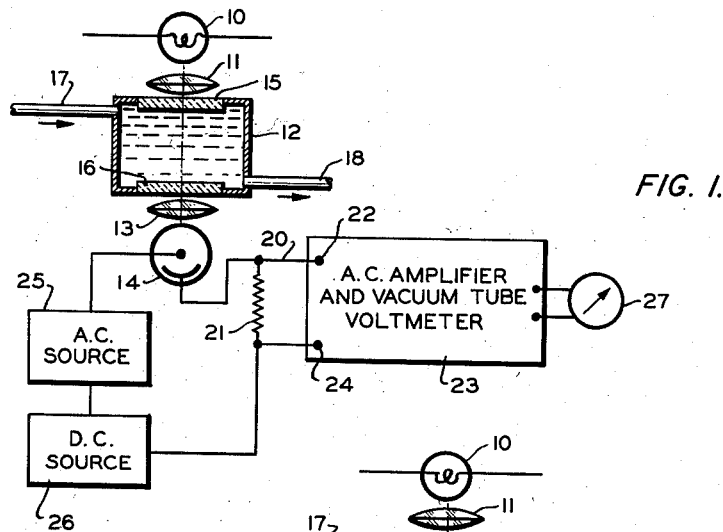
Figure 2:
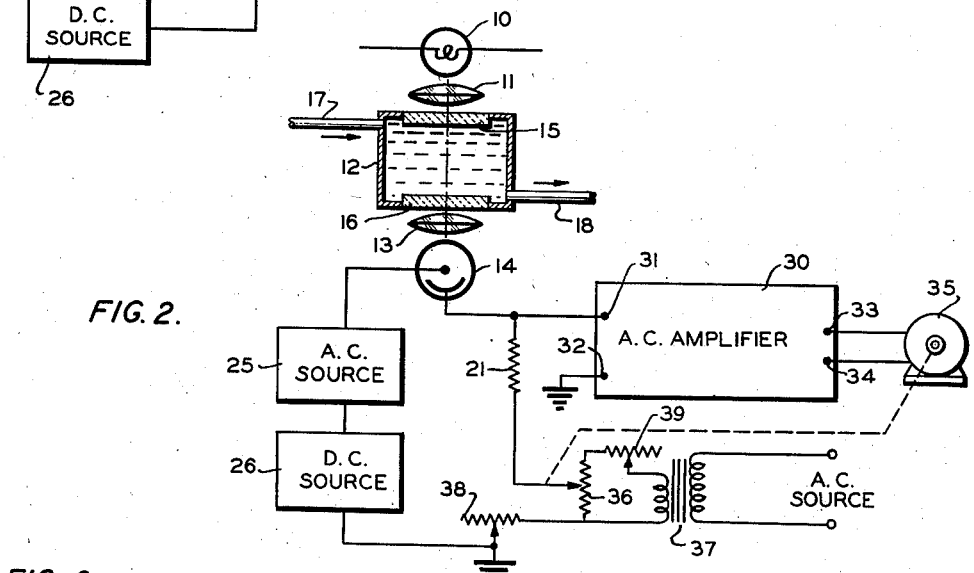
Figure 3:
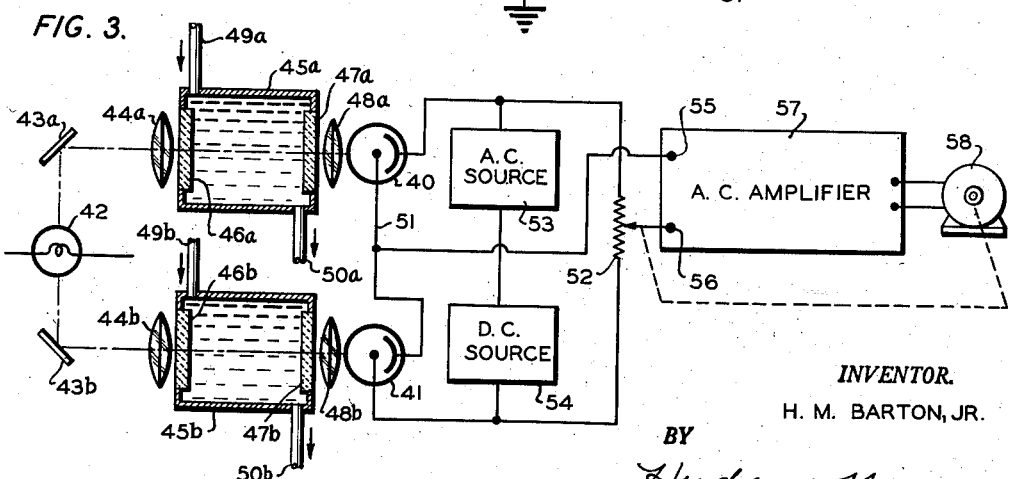
Figure 4:
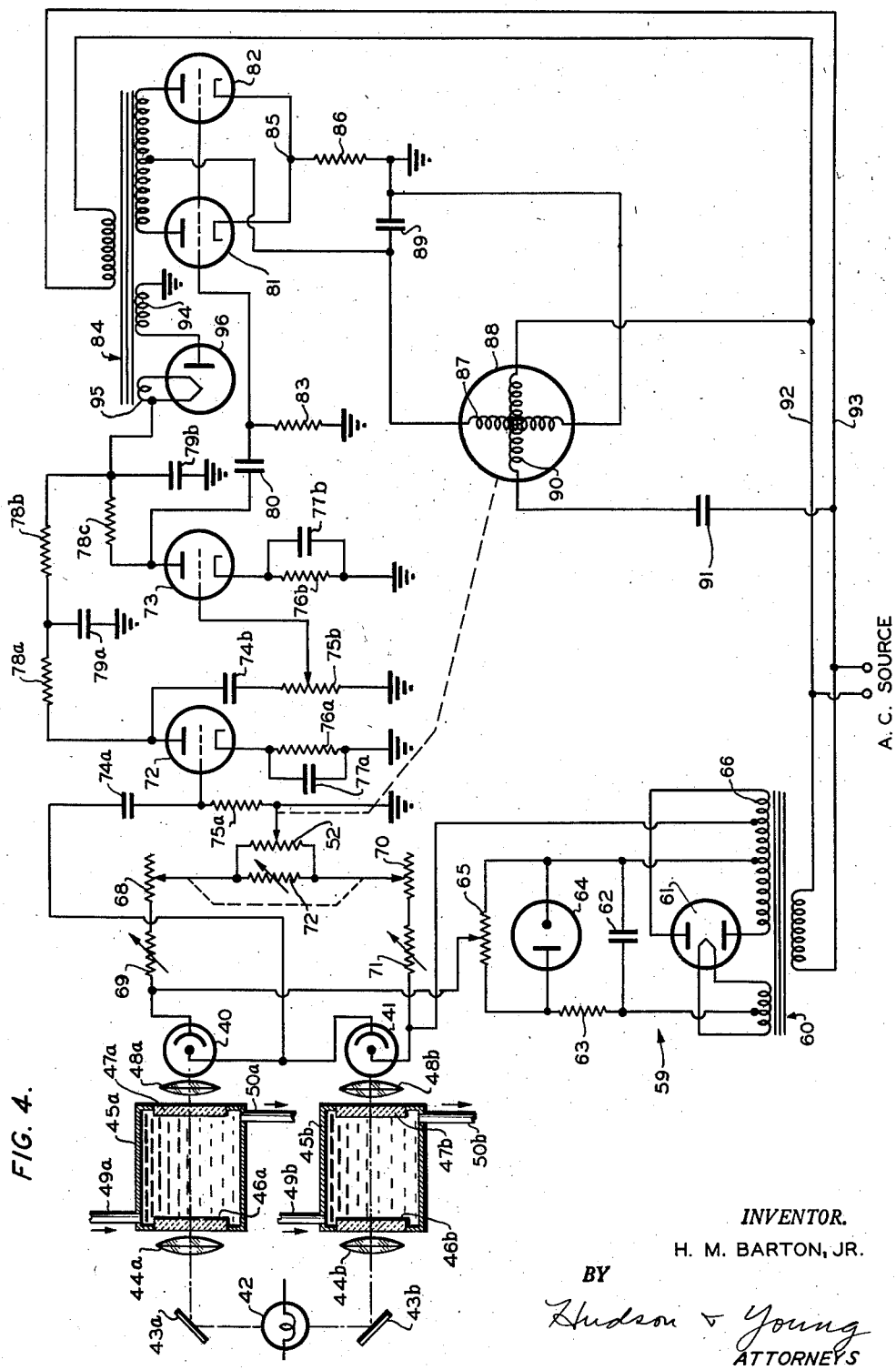

Various other objects, advantages and features of the invention will become apparent from the following detailed description taken in conjunction with the accompanying drawings, in which:

Figure 1 is a block diagram of a photoelectric analyzer constructed in accordance with the invention;

Figure 2 discloses a modified analyzer of the character shown by Figure 1;

Figure 3 is a block diagram of a photoelectric analyzer wherein the absorption of radiation by the material under test is compared with that of a standard material; and Figure 4 is a schematic circuit diagram of an actual photoelectric analyzer constructed in accordance with this invention.

Referring now to Figure 1, radiation from a source 10, such as an incandescent lamp or an ultraviolet lamp, passes through a lens 11, a sample cell 12 and a lens 13 to a photo emissive tube 14. The cell 12 is provided with transparent windows 15, 16 to permit passage of the radiation beam in the described manner. Cell 12 is also provided with an inlet 17 and an outlet 18 through which the material to be analyzed is fed to the cell and removed therefrom. The analyzer preferably but not necessarily receives continuously a continuous sample of material to be tested, as from a process to be controlled, and the material is continuously withdrawn through outlet 18. Where the stream contains a component having a particularly strong absorption band in the visible or ultraviolet light region, the intensity of the beam passing through the cell is a measure of the concentration of such component. In other cases, the total composition of the stream passing through the cell is determined by suitable calibration so as to provide an index of stream composition.

The photoemissive cell 14, which may be of the vacuum type or the gas type, has its cathode connected by a lead 20 to one terminal of an input load resistance 21 and to one input terminal 22 of an alternating current amplifier 23. The anode of the tube 14 returns to the other input terminal 24 of the amplifier and the other terminal of load resistance 21 through an alternating current source 25 and a direct current source 26, preferably connected in series. The output of the amplifier 23 is fed to a meter 27 or other suitable indicating device.

In operation, direct current source 26 maintains a positive potential at all times upon the anode of the photoemissive tube 14 so that a current continuously passes through this tube. Alternating current source 25 superimposes upon this direct voltage an alternating voltage which is also conducted by the photoemissive tube 14 and appears at the input circuit of amplifier 23. The voltages produced by the sources 25 and 26 are so proportioned that the saturation voltage of the tube is not exceeded when the alternating voltage reaches its maximum positive value and the radiation incident upon the tube 14 likewise reaches its maximum value. Similarly, the voltages are preferably so adjusted that when the alternating voltage reaches its minimum or greatest negative value, the anode is sufficiently positive that a definite, although small, current passes through the tube 14 and the input circuit of the amplifier.

As stated, variations in the composition of the stream flowing through sample cell 12 produce representative variations in the intensity of the radiation passing therethrough and incident upon the photoemissive tube 14. Increases in radiation intensity cause an increased emission of electrons from the cathode due to the photoelectric effect and result in the passage of a greater current through the tube while, conversely, decreases in radiation intensity cause less electrons to be emitted from the cathode and, hence, decrease the current passing through the tube. Thus, the variations in radiation intensity produce corresponding variations both in the alternating and direct components fed to the input circuit of the amplifier 23. This unit, however, picks up and amplifies only the alternating component, the magnitude of which is indicated by meter 27. Accordingly, by applying an alternating voltage superimposed upon a steady direct voltage between the anode and cathode of the photoemissive tube, I am able to utilize a compact inexpensive alternating current amplifier rather than a direct current amplifier. By suitable calibration of the meter 27, the instrument indicates directly the composition of the stream passing through the test cell 12. The use of ultraviolet radiation is preferred since many components of interest in chemical processes, and particularly in petroleum refining, have strong absorption bands in the ultraviolet region. Hence, there are many process streams where there is a selective absorption of radiation by one component and the reading on the meter is an index of the concentration of that component in the stream.

Referring now to Figure 2, I have shown a modified photoelectric analyzer utilizing a null circuit to provide the instrument reading with resultant increase in accuracy of reading and ease of calibration. In this modified circuit, parts similar to those described in connection with Figure 1 are indicated by like reference numerals. An alternating current amplifier 30 having input terminals 31, 32 is substituted for the amplifier 23 of Figure 1.

The amplifier 30 incorporates a circuit, which is preferably but not necessarily of the type to be described in detail hereinafter in connection with Figure 4. The circuit produces a positive voltage when the input signal to the amplifier is above a predetermined level and produces a negative voltage when the input to the amplifier is below such predetermined level, the magnitude of the voltage being proportional to the extent of deviation of the input voltage from said predetermined level. The output voltage of the phase detector appears across output terminals 33 and 34 which are connected to one winding of a two phase reversible motor 35 so that the motor rotates at a speed proportional to the deviation of the amplifier input voltage from the reference level, the direction of rotation being determined by the sense of said deviation. The motor shaft is mechanically coupled to the contactor of a potentiometer 36, an alternating voltage being applied across this potentiometer by any suitable source, such as a transformer 37 having its secondary winding connected in parallel therewith. The contactor of the potentiometer 36 is connected to the lower terminal of fixed load resistance 21 and one fixed terminal of this potentiometer is connected to input terminal 32 and to the direct current source 26 through a variable resistance 38.

When the substance passing through sample cell 12 has a desired composition, a radiation beam of reference intensity is incident upon photoemissive cell 14. As a result, a reference alternating current is conducted by the tube 14 which is opposed by the alternating voltage impressed across potentiometer 36 by alternating current source 37. Under these conditions, the circuit is balanced and no output is produced by the amplifier 30. When the radiation intensity is less than the reference level, the current passing through the tube 14 is decreased with the result that a voltage appears across input terminals 31 and 32. This causes operation of motor 35 with resultant movement of the contactor of potentiometer 36 until a balanced condition is again achieved in the circuit. An opposite effect is produced by an increase in radiation intensity above the reference level causing motor 35 to rotate in the opposite direction and causing the contactor of potentiometer 36 to move in the opposite direction until a balanced condition is obtained. It will be evident, therefore, that the position of the contactor of potentiometer 36 is representative of the departure of the radiation intensity from its reference level and, hence, of departures in composition of the stream passing through cell 12 from the desired reference composition. The movement of the arm of potentiometer 36 can be used, in well understood fashion, to operate a recorder or controller to indicate the variations in composition of the stream or, alternatively, to control a suitable process variable so as to maintain the stream at a desired composition.

In the circuit of Figure 2, a variable resistance 38 is inserted between the lower fixed terminal of potentiometer 36 and ground, which is connected to the amplifier input terminal 32 and alternating current source 26. Adjustment of variable resistor 38 varies the setting of the null point of potentiometer 36 and, thus, permits selection of the desired reference level for operation of the circuit and analyzer. The sensitivity of the circuit can be adjusted by a variable resistance 39 connected in series with the secondary winding of transformer 37 and the fixed terminals of potentiometer 36. Adjustment of variable resistance 39 varies the alternating voltage appearing across potentiometer 36 and, hence, the extent of travel of the contactor to produce a predetermined change in the voltage impressed thereon.

In Figure 3, I have shown a modified photoelectric analyzer in which the intensity of radiation passing through the test cell is compared with the intensity of radiation passing through a standard cell. Such comparison compensates for the effect of variations in intensity of the source and for other changes in the optical system. This circuit utilizes two photoemissive tubes 40 and 41. Radiation from a source 42 is transmitted by a mirror 43a and a lens 44a to a standard cell 45a provided with transparent windows 46a, 47a, the radiation from the cell 45a passing through a lens 48a to the photoemissive cell 40. Cell 45a is provided with an inlet 49a and an outlet 50a to permit the test fluid to be admitted thereto and removed therefrom. Radiation from the source 42 also passes through a similar system to the photoemissive cell 41, similar parts being indicated by corresponding reference numerals with different reference letters. The cell 45b is adapted to contain a standard liquid, the composition of which can be the desired composition of the stream to be analyzed. Alternatively, cell 45b can contain a pure component of the same composition as a component in the sample stream which preferentially absorbs radiation of the type produced by source 42. If desired, one or more filter cells can be included in one or both optical systems to remove desired bands of radiations or to cancel out the effect of absorption of certain components in the test stream.

The anode of tube 40 is connected to the cathode of tube 41 by a lead 51, and a potentiometer 52 has one fixed terminal connected to the cathode of tube 40, the other fixed terminal being connected to the anode of tube 41. A unit including an alternating current source 53 and a direct current source 54 in series therewith is connected in parallel with the fixed terminals of potentiometer 52. The input terminals 55 and 56 of an alternating current amplifier 57 are connected, respectively, to lead 51 and to the contactor of potentiometer 52. The output of the amplifier is fed to a two phase reversible servomotor 58, the shaft of which is mechanically connected to the contactor of potentiometer 52.

It will be evident that the photoemissive cells 40, 41 are connected in a balanced bridge circuit with potentiometer 52, and that each cell has impressed upon its anode an alternating voltage superimposed upon a steady direct voltage, as described in connection with Figures 1 and 2. Further, due to the connection of motor 58 to the contactor of potentiometer 52, the contactor is continuously driven to a point where the amplifier input is zero. Thus, the position of the contactor is an index of the relative intensity of the radiation incident upon the photoemissive tubes 40 and 41. Where the standard cell 45b contains a substance whose composition is the desired composition of the test material passing through cell 45a, it will be evident that the bridge is balanced when the contactor of potentiometer 52 is at the middle of its scale. Deviations in the position of the contactor thereupon indicate deviations in radiation absorption of the sample or test stream as compared with the absorption of a stream having the desired composition. Ordinarily, such deviations are caused by variations in a component having a strong absorption band at the frequency of radiation utilized in the analyzer. Where the standard cell contains a pure component corresponding to one of the components of the test stream and such component strongly absorbs the radiation, the position of the contactor substantially represents the concentration of such component in the test stream.

It will be noted that the advantages resulting from the combining of alternating and direct voltages applied to the photoemissive tubes are realized in the circuit of Figure 3 as well as in the circuits of Figures 1 and 2. That is, an alternating current amplifier of compact size and standard construction can be used instead of a direct current amplifier.

In Figure 4, I have shown the actual circuit of a photoelectric analyzer constructed in accordance with Figure 3, the circuit incorporating certain novel features which will be hereinafter described. The optical system is similar to that of Figure 3 and, hence, like parts will be indicated by similar reference characters.

The voltage represented in Figure 3 by the series connection of sources 53 and 54 is provided by a power pack 59 which includes a power transformer 60, dual diode rectifier 61, filter condenser 62, filter resistance 63, voltage regulator tube 64 and output potentiometer 65. These parts produce a positive direct voltage with respect to the center tap of the transformer secondary winding, the voltage of which is adjustable by potentiometer 65. However, the negative terminal, instead of being connected to the center tap, is connected to a tap 66 sufficiently far removed from the center as to provide an alternating component of the desired magnitude in the output voltage of the power pack. Thus, the voltage applied between the anode of tube 41 and the cathode of tube 40 is an alternating voltage superimposed upon a steady direct voltage, the voltages being chosen, as described in connection with Figure 1, so that the saturation current of the tube is not exceeded and so that the tubes conduct a small current even during the negative peaks of the alternating voltage.

The potentiometer 52, instead of being directly connected to the photoelectric tubes, has one fixed terminal connected through variable resistances 68 and 69 to the cathode of tube 40, the other fixed terminals being connected through variable resistances 70 and 71 to the anode of tube 41. Resistances 68 and 70 are reversely ganged, these units controlling the zero setting of the bridge circuit, that is, the reference level of the difference in radiation intensities incident upon the tubes 40 and 41. Variable resistances 69 and 71 function as auxiliary range or zero setting controls. The fixed terminals of potentiometer 52 are shunted by a variable resistance 72 which varies the sensitivity of the circuit, that is, the extent of movement of the contactor of potentiometer 52 necessary to produce a given voltage variation.

The alternating current amplifier includes two conventional stages of voltage amplification including two tubes 72, 73 provided, respectively, with input coupling condensers 74a, 74b, grid resistances 75a, 75b, cathode bias resistors 76a, 76b, bypass condensers 77a, 77b, anode filter resistors 78a, 78b, 78c, and bypass condensers 79a, 79b. As in Figure 3, the input terminals of the amplifier are connected to lead 51 and the contactor of potentiometer 52. The output of the amplifier is fed through a coupling condenser 80 to both control grids of a pair of triodes 81 and 82, these control grids being provided with a grid resistance 83. The anodes of triodes 81, 82 are connected to the respective fixed terminals of a secondary winding of a transformer 84, the cathodes being connected together by a lead 85 which is grounded through a fixed resistance 86. The center tap of the aforesaid secondary winding is connected to one terminal of a winding 87 of a two phase reversible motor 88, the other terminal of winding 87 being connected to ground and thereby through fixed resistance 86 to the cathodes of tubes 81 and 82. A condenser 89 is connected in parallel with winding 87. The motor 88 has a winding 90 which is ninety degrees out of phase with respect to winding 87, and this winding is connected through a condenser 91 to the terminals 92, 93 of an alternating current line which supplies current to the primary winding of transformer 84. This transformer also has secondary windings 94, 95 forming, together with a diode rectifier 96, a power supply furnishing anode voltage to the amplifier tubes 72 and 73.

When the intensities of the radiation beams passing through cells 45a, 45b to the photoemissive tubes 40, 41 are in a predetermined ratio, potentiometer 52 is so adjusted that a predetermined signal level is produced at the output of the voltage amplifier. It will be understood that this signal is the alternating component of the currents conducted by the tubes 40, 41 as a result of the number of electrons emitted from their cathodes due to the incidence of radiation thereon. Signals at this predetermined level produce a voltage in winding 87 through the triodes 81 and 82 which causes an opposite effect upon the rotor of the motor with respect to the effect produced by the current flowing through winding 90. Under these conditions, no movement of the motor occurs and the system is in equilibrium. When an unbalance of the photoemissive cell bridge circuit occurs due to changes in the amount of radiation passing through cells 45a, 45b a signal is produced in the amplifier input which is greater or less than the predetermined level. This results in the application of a phase shifted voltage to the winding 88, the direction of phase shift being determined by the ratio of light on the bridge phototubes. This results from the fact that the tubes 81, 82 in effect, compare the phase of the signal impressed upon their control grids with the phase of the signal appearing across the center tapped secondary winding of transformer 84. As a result, motor 88 moves in the proper direction to cause the contactor of potentiometer 52 to again balance the bridge circuit. The position of the contactor of potentiometer 52 is, therefore, representative of the relative amounts of radiation incident upon the photoemissive tubes 40, 41 and, hence, of the relative absorption produced by the materials in cells 45a and 45b. By suitable calibration and selection of materials for insertion into the standard cell, the position of the potentiometer contactor can be made representative either of total stream composition or of the concentration of a particular component or group of components in the stream of material fed through cell 45a.

It will be apparent that I have achieved the objects of my invention in providing an improved photoelectric analyzer which is accurately responsive to changes in composition of a test stream or to changes in the composition of a particular component or group of components in the test stream. It is an advantage of the novel photoelectric analyzer that an alternating current amplifier is utilized to respond to the relative slow changes in concentration of the material passing through the test cell, as compared with the prior use of a relative bulky and expensive direct current amplifier for this purpose.

While the invention has been described in connection with a present, preferred embodiment thereof, it is to be understood that this description is illustrative only and is not intended to limit the invention.

I claim:

1. In a photoelectric amplifier, in combination, a pair of photoemissive tubes each having an anode and a cathode, a lead connecting the anode of one tube with the cathode of the other tube, a unit for applying a potential between the cathode of said one tube and the anode of said other tube, said unit producing an alternating voltage superimposed upon a steady direct voltage, an impedance network connected in parallel with said unit including, in series, a first variable resistance, a second variable resistance, the fixed terminals of a potentiometer, a third variable resistance and a fourth variable resistance, said second and third variable resistances being reversely ganged to provide a zero adjustment, a variable resistance connected in parallel with the fixed terminals of said potentiometer to provide a sensitivity adjustment, said first and fourth variable resistances serving as auxiliary zero adjustment controls, an alternating current amplifier including an input circuit having one terminal connected to said lead and its other terminal connected to the contactor of said potentiometer, a two phase motor having its shaft mechanically connected to the contactor of said potentiometer, said motor having two windings which are ninety degrees out of phase, a unit including a pair of vacuum tubes each having an anode, a cathode and a control grid, means for applying the output of said alternating current amplifier to both control grids, a transformer having a center tapped secondary winding, the end terminals of which are connected to the respective anodes of said vacuum tubes, a series circuit including one winding of said motor, the cathodes of both vacuum tubes, the anodes of both vacuum tubes, and said center tap, means for supplying an alternating voltage to the primary winding of said transformer and to the other winding of said motor, and a condenser connected in circuit with each winding of said motor.

2. In a photoelectric amplifier, in combination, a pair of photoemissive tubes each having an anode and a cathode, a lead connecting the anode of one tube with the cathode of the other tube, a unit for applying a potential between the cathode of said one tube and the anode of said other tube, said unit producing an alternating voltage superimposed upon a steady direct voltage, an impedance network connected in parallel with said unit including, in series, a first variable resistance, a second variable resistance, the fixed terminals of a potentiometer, a third variable resistance and a fourth variable resistance, said second and third variable resistances being ganged to provide a zero adjustment, a variable resistance connected in parallel with the fixed terminals of said potentiometer to provide a sensitivity adjustment, said first and fourth variable resistances serving as auxiliary zero adjustments, an alternating current amplifier including an input circuit having one terminal connected to said lead and its other terminal connected to the contactor of said potentiometer, a sample cell having transparent windows, an inlet and an outlet for introducing material to be analyzed into said sample cell, a standard cell having transparent windows, an inlet and an outlet for said standard cell to introduce and remove standard material, an ultraviolet radiation source, means for focusing ultraviolet radiation from said source through the transparent windows of said sample cell upon one of said photoemissive tubes, means for focusing ultraviolet radiation from said source through the transparent windows of said standard cell upon the other photoemissive tube, a two phase motor having its shaft mechanically connected to the contactor of said potentiometer, said motor having two windings which are ninety degrees out of phase, a unit including a pair of vacuum tubes each having an anode, a cathode and a control grid, means for applying the output of said alternating current amplifier to both control grids, a transformer having a center tapped secondary winding, the end terminals of which are connected to the respective anodes of said vacuum tubes, a series circuit including one winding of said motor, the cathodes of both vacuum tubes, the anodes of both vacuum tubes, and said center tap, means for supplying an alternating voltage to the primary winding of said transformer and to the other winding of said motor, and a condenser connected in circuit with each winding of said motor, said radiation from said radiation source producing an essentially direct current signal at both of said tubes, the signal at said one tube varying slowly with changes in composition of said sample material, said alternating current amplifier being responsive to said essentially direct current signals produced by interaction of said radiation source, the standard material, the sample material and said tubes due to the application of both alternating and direct current to said tubes.

3. In a photoelectric amplifier, in combination, a pair of photoemissive tubes each having an anode and a cathode, a lead connecting the anode of one tube with the cathode of the other tube, a unit for applying a potential between the cathode of said one tube and the anode of said other tube, said unit producing an alternating voltage superimposed upon a steady direct voltage, an impedance network connected in parallel with said unit including, in series, a first variable resistance, a second variable resistance, the fixed terminals of a potentiometer, a third variable resistance and a fourth variable resistance, said second and third variable resistances being reversely ganged to provide a zero adjustment, a variable resistance connected in parallel with the fixed terminals of said potentiometer to provide a sensitivity adjustment, said first and fourth variable resistances serving as auxiliary zero adjustment controls, an alternating current amplifier including an input circuit having one terminal connected to said lead and its other terminal connected to the contactor of said potentiometer, a servo-motor having its shaft mechanically connected to the contactor of said potentiometer, and means connecting the output of said alternating current amplifier to said motor, whereby said motor drives the contactor of said potentiometer to a position where the input circuit of the amplifier is balanced.

4. In a photoelectric amplifier, in combination, a pair of photoemissive tubes each having an anode and a cathode, a lead connecting the anode of one tube with the cathode of the other tube, a unit for applying a potential between the cathode of said one tube and the anode of said other tube, said unit producing an alternating voltage superimposed upon a steady direct voltage, an impedance network connected in parallel with said unit including, in series, a first variable resistance, the fixed terminals of a potentiometer, and a second variable resistance, said variable resistances being reversely ganged to provide a zero adjustment, an alternating current amplifier including an input circuit having one terminal connected to said lead and its other terminal connected to the contactor of said potentiometer, a two phase motor having its shaft mechanically connected to the contactor of said potentiometer, said motor having two windings which are ninety degrees out of phase, a unit including a pair of vacuum tubes each having an anode, a cathode and a control grid, means for applying the output of said alternating current amplifier to both control grids, a transformer having a center tapped secondary winding, the end terminals of which are connected to the respective anodes of said vacuum tubes, a series circuit including one winding of said motor, the cathodes of both vacuum tubes, the anodes of both vacuum tubes, and said center tap, means for supplying an alternating voltage to the primary winding of said transformer and to the other winding of said motor, and a condenser connected in circuit with each winding of said motor.

References Cited in the file of this patent

UNITED STATES PATENTS

| | | |
|---|---|---|
| Re. 23,023 | Wolf et al. | Aug. 3, 1948 |
| 1,746,525 | Darrah | Feb. 11, 1930 |
| 2,019,871 | Pettingill et al. | Nov. 5, 1935 |
| 2,142,378 | Sachtleben | Jan. 3, 1939 |
| 2,342,986 | Van Den Bosch | Feb. 29, 1944 |
| 2,358,103 | Ryder | Sept. 12, 1944 |
| 2,522,976 | Williams | Sept. 19, 1950 |
| 2,547,212 | Jamison et al. | Apr. 3, 1951 |
| 2,593,616 | Schroeder et al. | Apr. 22, 1952 |